(12) United States Patent
Zhao et al.

(10) Patent No.: US 11,099,114 B2
(45) Date of Patent: Aug. 24, 2021

(54) TEST DEVICE AND TEST METHOD FOR ROTARY PRESSURIZED FILTER AND METHOD FOR DESIGNING FILTER

(71) Applicant: TIANHUA INSTITUTE OF CHEMICAL MACHINERY AND AUTOMATION CO., LTD, Gansu (CN)

(72) Inventors: Xu Zhao, Gansu (CN); Wanyao Zhang, Gansu (CN); Yongpeng Tan, Gansu (CN); Tianbao Wang, Gansu (CN); Xiangnan Zhai, Gansu (CN); Yanshun Shen, Gansu (CN); Guohai Zhang, Gansu (CN); Yu Guo, Gansu (CN); Xiaopeng Feng, Gansu (CN); Yuanyue Liang, Gansu (CN); Xiaoling Xie, Gansu (CN)

(73) Assignee: TIANHUA INSTITUTE OF CHEMICAL MACHINERY AND AUTOMATION CO., LTD, Gansu (CN)

( * ) Notice: Subject to any disclaimer, the term of this patent is extended or adjusted under 35 U.S.C. 154(b) by 212 days.

(21) Appl. No.: 16/346,460

(22) PCT Filed: May 15, 2017

(86) PCT No.: PCT/CN2017/084348
§ 371 (c)(1),
(2) Date: Apr. 30, 2019

(87) PCT Pub. No.: WO2018/171026
PCT Pub. Date: Sep. 27, 2018

(65) Prior Publication Data
US 2019/0301991 A1    Oct. 3, 2019

(30) Foreign Application Priority Data
Mar. 23, 2017   (CN) .......................... 201710177786.8

(51) Int. Cl.
*G01N 15/08*    (2006.01)

(52) U.S. Cl.
CPC ....... *G01N 15/08* (2013.01); *G01N 2015/084* (2013.01)

(58) Field of Classification Search
CPC .. G01N 15/00; G01N 15/08; G01N 2015/084; B01D 61/00; B01D 61/14–22
See application file for complete search history.

(56) References Cited

U.S. PATENT DOCUMENTS 3,946,596 A * 3/1976 Shiuh ..................... B01D 35/00
                                                         73/38
7,677,084 B2 * 3/2010 Tyrell ..................... G01N 11/02
                                                         73/38

(Continued)

FOREIGN PATENT DOCUMENTS

| CN | 1596145 A | 3/2005 |
| CN | 101146758 A | 3/2008 |

(Continued)

OTHER PUBLICATIONS

Li, Fajun, "The Experimental Research on the Multi-Stage Filtration Flow under Pressure Variation in the series of Dynamic Rotary Vane Press Filter", Science-Engineering, China Master's Theses Full-Text Database, Series I of Engineering Science and Technology, No. S2, Dec. 15, 2011, pp. 1-60, ISSN: 1674-0246, pp. 21-22.

(Continued)

*Primary Examiner* — Nguyen Q. Ha
(74) *Attorney, Agent, or Firm* — Muncy, Geissler, Olds & Lowe, P.C.

(57) ABSTRACT

A testing device, a testing method, and a design method for a rotary pressure filter. The device includes a stabilizer tank; a buffer tank connected to the stabilizer tank; a filter frame disposed beneath the buffer tank, and connected to the buffer tank; a liquid receiving tank disposed beneath the filter (Continued)

frame; an electronic balance disposed at bottom of the liquid receiving tank; and a seconds counter. The testing method includes adding a certain calculated amount of testing slurry into the filter frame, introducing a gas with a certain pressure into the stabilizer tank, filling the filter frame through the buffer tank, opening a valve at bottom of the filter frame, measuring a mass of the expelled filtrate expelled from the filter frame, measuring time of the filtering process, sampling and analyzing the filter cake and the expelled filtrate according to actual needs; and perform cleaning and drying processes sequentially.

10 Claims, 1 Drawing Sheet

(56) References Cited

U.S. PATENT DOCUMENTS

| | | |
|---|---|---|
| 2011/0067485 A1 | 3/2011 | Grant et al. |
| 2014/0298893 A1 | 10/2014 | Laubstein et al. |

FOREIGN PATENT DOCUMENTS

| | | | | |
|---|---|---|---|---|
| CN | 102476994 A | 5/2012 | | |
| CN | 102580546 A | 7/2012 | | |
| CN | 102614692 A | 8/2012 | | |
| CN | 102861472 A | 1/2013 | | |
| CN | 102834367 B | 2/2013 | | |
| CN | 103497777 A | 1/2014 | | |
| CN | 103386227 B | 5/2015 | | |
| CN | 105085231 A | 11/2015 | | |
| CN | 105727750 B | 2/2018 | | |
| GB | 1161684 A | * | 8/1969 | ........... G01N 15/082 |
| JP | 2007014948 A | 1/2007 | | |
| JP | 2013505824 A | 2/2013 | | |
| TW | I-468385 B | 1/2015 | | |
| WO | WO 2014/095302 A1 | 6/2014 | | |
| WO | WO-2015-162281 A1 | 10/2015 | | |

OTHER PUBLICATIONS

"Instruction Manual for Plate-and-Frame Filter Press," Shanghai Dazhang Filtrate Equipment co., Ltd., Mar. 9, 2017, 3 pages.

Li, Fajun et al. "The Experimental Research on the Multi-Stage Filtration Flow under Pressure Variation in the Series of Dynamic Rotary Vane Press Filter"; Science-Engineering (A), China Master's Theses Full-Text Database) No. S2, Dec. 15, 2011 (Dec. 15, 2011), ISSN: 1674-0246, pp. 21-22.

* cited by examiner

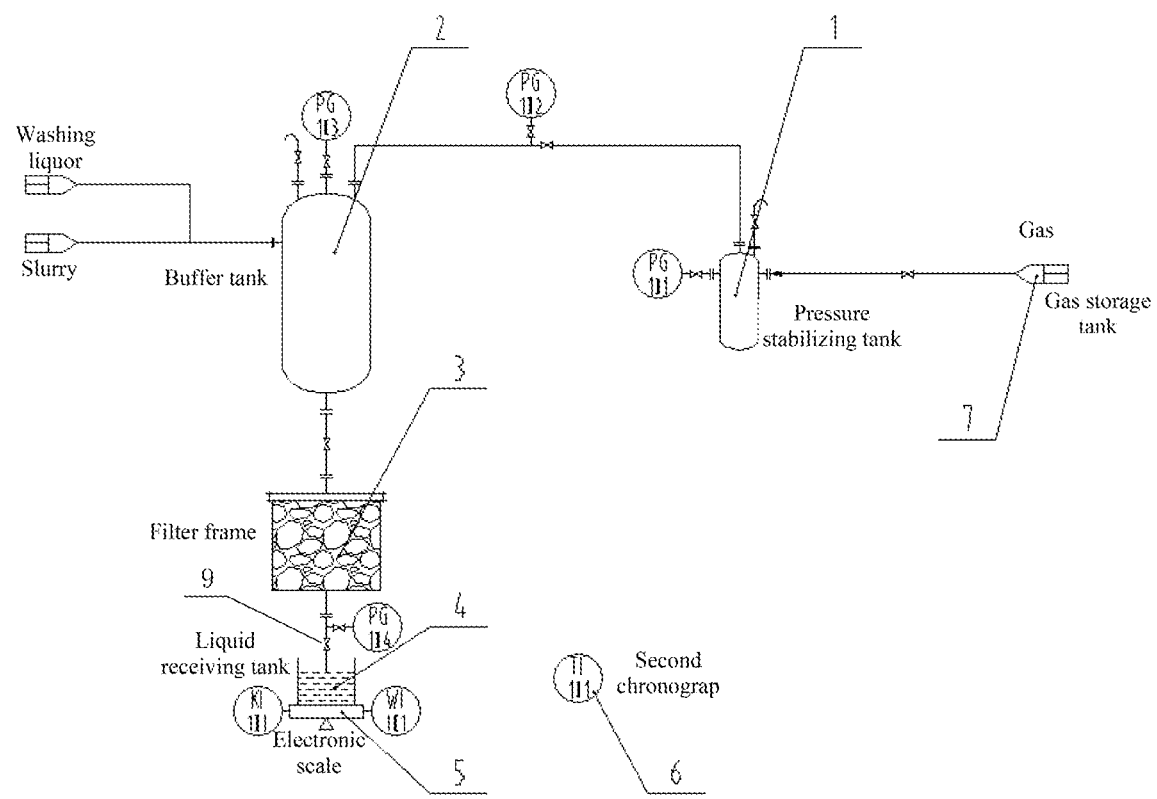

TEST DEVICE AND TEST METHOD FOR ROTARY PRESSURIZED FILTER AND METHOD FOR DESIGNING FILTER

FIELD OF THE INVENTION

The present invention relates to a field of a rotary pressure filter used in production and preparation of PTA (pure terephthalic acid), in particular to a testing device, a testing method and a designing method for the rotary pressure filter.

RELATED ART

A rotary pressure filter is widely used in many applications, especially highly demanded in the PTA industry. Differences in material characteristics significantly affect design and module selection of a pressure filter. Conventionally, in order to test material characteristics during design and module selection of the rotary pressure filter, a small-sized testing device for the rotary pressure filter is required. The conventional testing device is designed and manufactured according to a large-sized industrial rotary pressure filter exactly and is merely scaled down in volume. The conventional testing device includes all the components of the large-sized industrial rotary pressure filter, such as a driving system. Accordingly, the testing device has a complex structure and a high manufacturing cost. With such a conventional testing device, the testing procedure is much complex and takes a high cost. In addition, due to special characteristics of some materials, washing and drying processes may have to be performed for many times. However, since the small-sized testing device for the rotary pressure filter is small in volume, it is impossible to provide enough function zones in structure. Thus, it is impossible to perform the washing and drying processes many times for simulating requirements of the materials exactly, or to obtain accurate design parameters for special materials.

SUMMARY OF THE INVENTION

One object of the present invention is to provide a testing device, a testing method and a designing method for a rotary pressure filter, to solve the drawbacks of the small-sized rotary pressure filter testing device in the prior art which is incapable of obtaining accurate test parameters of slurry.

In order to achieve the above object, the present invention provides a testing device for a rotary pressure filter, comprising:

a pressure stabilizing tank;

a buffer tank connected to the pressure stabilizing tank through a first pipe;

a filtering frame disposed under the buffer tank, and connected to the buffer tank through a second pipe;

a liquid receiving tank disposed under the filtering frame, a valve disposed under the filtering frame above the liquid receiving tank; and an electronic scale disposed at the bottom of the liquid receiving tank.

In order to achieve the above object, the present invention further provides a testing method for a rotary pressure filter, comprising:

a first step of opening a feeding inlet of a buffer tank, feeding slurry into the buffer tank, and conveying the slurry to a filtering frame;

a second step of opening a gas valve at a gas inlet of the buffer tank, introducing a gas at a pressure of 0.01-2.0 Mpa into the buffer tank through a pressure stabilizing tank, opening a valve at the bottom of the filtering frame to perform filtering, allowing liquid in the slurry to be expelled as a filtrate and solid in the slurry to accumulate in the filtering frame as a filter cake; measuring filtering time, measuring a mass of expelled filtrate at the same time, closing the valve at the bottom of the filtering frame and the gas valve upon the liquid in the filtering frame is expelled to an extent that the level of the liquid is flush with an upper surface of the filter cake, draining the gas out of the filtering frame, and then sampling the expelled filtrate to analyze content of components and impurities contained in the expelled filtrate;

a third step of inputting washing liquor into the filtering frame through the buffer tank to wash the slurry, introducing a gas at a pressure of 0.01-2.0 Mpa into the buffer tank through the pressure stabilizing tank and then into the filtering frame through the buffer tank during the washing process, opening the valve at the bottom of the filtering frame, measuring a mass of expelled washing filtrate via an electronic scale until the mass of the expelled washing filtrate is equal to the mass of the input washing liquor, measuring the washing time, and sampling the expelled washing filtrate to analyze content of components and impurities contained in the expelled washing filtrate;

a fourth step of introducing a dry gas at a pressure of 0.01-2.0 Mpa into the pressure stabilizing tank and then into the filtering frame through the buffer tank, then opening the valve at the bottom of the filtering frame, measuring a mass of expelled dried filtrate via the electronic scale, measuring the drying time, and then sampling the expelled dried filtrate to analyze content of components and impurities contained in the expelled dried filtrate; and a fifth step of opening the filtering frame, measuring the thickness of the filter cake, and then sampling the filter cake to analyze moisture content of the filter cake as well as content of components and impurities contained in the filter cake.

In order to achieve the above object, the present invention further provides a a rotary pressure filter, comprising:

a first step of opening a feeding inlet of a buffer tank, feeding slurry into the buffer tank, and conveying the slurry to a filtering frame;

a second step of opening a gas valve at a gas inlet of the buffer tank, introducing a gas at a pressure of 0.01-2.0 Mpa into the buffer tank through a pressure stabilizing tank, opening a valve at the bottom of the filtering frame to perform filtering, allowing liquid in the slurry to be expelled as a filtrate and solid in the slurry to accumulate in the filtering frame as a filter cake; measuring filtering time, measuring a mass of expelled filtrate at the same time, closing the valve at the bottom of the filtering frame and the gas valve upon the liquid in the filtering frame is expelled to an extent that the level of the liquid is flush with an upper surface of the filter cake, draining the gas out of the filtering frame, and then sampling the expelled filtrate to analyze content of components and impurities contained in the expelled filtrate;

a third step of inputting washing liquor into the filtering frame through the buffer tank to wash the slurry, introducing a gas at a pressure of 0.01-2.0 Mpa into the buffer tank through the pressure stabilizing tank and then into the filtering frame through the buffer tank during the washing process, opening the valve at the bottom of the filtering frame, measuring a mass of expelled washing filtrate via an electronic scale until the mass of the expelled washing filtrate is equal to the mass of the input washing liquor, measuring the washing time, and sampling the expelled washing filtrate to analyze content of components and impurities contained in the expelled washing filtrate;

a fourth step of introducing a dry gas at a pressure of 0.01-2.0 Mpa into the pressure stabilizing tank and then into the filtering frame through the buffer tank, then opening the valve at the bottom of the filtering frame, measuring a mass of expelled dried filtrate via the electronic scale, measuring the drying time, and then sampling the expelled dried filtrate to analyze content of components and impurities contained in the expelled dried filtrate; and a fifth step of opening the filtering frame, measuring the thickness of the filter cake, and then sampling the filter cake to analyze moisture content of the filter cake as well as content of components and impurities contained in the filter cake.

BRIEF DESCRIPTION OF THE DRAWINGS

The sole FIGURE is a structural diagram of a testing device for a rotary pressure filter according to the present invention.

REFERENCE SIGNS LIST 1 pressure stabilizing tank
2 buffer tank
3 filtering frame
4 liquid receiving tank
5 electronic scale
6 chronograph
7 gas storage tank

DETAILED DESCRIPTION OF THE INVENTION

The sole FIGURE is a flow diagram of a testing device for a rotary pressure filter according to the present invention. As shown in the sole FIGURE, the testing device for the rotary pressure filter according to the present invention may comprise:

a pressure stabilizing tank 1;
a buffer tank 2 connected to the pressure stabilizing tank 1 through a first pipe;
a filtering frame 3 disposed under the buffer tank 2 and connected to the buffer tank 2 through a second pipe, a valve 9 disposed under the filter frame 3;
a liquid receiving tank 4 disposed under the filtering frame 3; and
an electronic scale 5 disposed at the bottom of the liquid receiving tank 4.

Further, the testing device for the rotary pressure filter according to the present invention may comprise a chronograph 6 for measuring the time for performing filtering, washing and drying processes.

Further, the pressure stabilizing tank 1 is connected to a gas storage tank 7 in which nitrogen gas, compressed air or other inert gases are stored. The gas storage tank 7 may be a gas source with a fixed pressure.

Further, the present invention provides a testing method for the rotary pressure filter, comprising:

Step 1: opening a feeding inlet of the buffer tank 2, feeding slurry into the buffer tank 2, and conveying the slurry to the filtering frame 3;

Step 2: opening a gas valve at a gas inlet of the buffer tank 2, introducing a gas at a pressure of 0.01-2.0 Mpa into the buffer tank 2 through the pressure stabilizing tank 1, opening the valve at the bottom of the filtering frame 3 to perform filtering, allowing liquid in the slurry to be expelled as a filtrate and solid in the slurry to accumulate in the filtering frame as a filter cake; measuring filtering time t, measuring a mass m of expelled filtrate at the same time, closing the valve at the bottom of the filtering frame 3 and the gas valve upon the liquid in the filtering frame 3 is expelled to an extent that the level of the liquid is flush with an upper surface of the filter cake, draining the gas out of the filtering frame 3, and then sampling the expelled filtrate to analyze content of components and impurities contained in the expelled filtrate;

Step 3: inputting washing liquor into the filtering frame 3 through the buffer tank 2 to wash a filter case, introducing a gas at a pressure of 0.01-2.0 Mpa into the buffer tank 2 through the pressure stabilizing tank 1 and then into the filtering frame 3 during the washing process, opening the valve at the bottom of the filtering frame 3, measuring a mass of expelled washing filtrate via the electronic scale 5 until the mass of the expelled washing filtrate is equal to the mass of the input washing liquor, measuring the washing time, and then sampling the expelled washing filtrate to analyze content of components and impurities contained in the expelled washing filtrate;

Step 4: introducing a dry gas at a pressure of 0.01-2.0 Mpa into the buffer tank 2 through the pressure stabilizing tank 1 and then into the filtering frame 3, opening the valve at the bottom of the filtering frame 3, measuring a mass of expelled dried filtrate via the electronic scale 5, measuring the drying time, and then sampling the expelled dried filtrate to analyze content of components and impurities contained in the expelled dried filtrate; and Step 5: opening the filtering frame 3, measuring the thickness of the filter cake, and then sampling the filter cake to analyze moisture content of the filter cake as well as content of components and impurities contained in the filter cake.

Here, the slurry may be CTA slurry, PTA slurry, catalyst slurry, pulverized coal slurry or any other suspensions in which solid and liquid may be freely separated by sediment. The gas may be nitrogen gas, compressed air or an inert gas.

Here, as necessary, the filtering process in Step 2 may be performed once or many times. As necessary, the washing process in Step 3 may be performed once or many times. As necessary, the drying process in Step 4 may be performed once or many times. Further, the order of the filtering process in Step 2, the washing process in Step 3, and the drying process in Step 4 may be exchanged depending on the specific process. Preferably, the washing process in Step 3 may be performed for many times.

The filtering frame 3 may have a circle shape or a rectangular shape. The filtering frame 3 may be filled with a filter holder wrapped with filter cloth, or other filter media. The pressure stabilizing tank 1 may be a pressure reducing valve or other pressure stabilizing devices. Alternately, the buffer tank 2 may be other feeding buffer devices. Alternately, the electronic scale 5 may be other weight measuring devices. Alternately, the chronograph 6 may be other timing devices.

Further, the present invention provides a designing method for the rotary pressure filter, comprising:

Step 1: opening a feeding inlet of a buffer tank, feeding slurry into the buffer tank, and conveying the slurry to a filtering frame;

Step 2: opening a gas valve at a gas inlet of the buffer tank 2, introducing a gas at a pressure of 0.01-2.0 Mpa into the buffer tank 2 through the pressure stabilizing tank 1, opening the valve at the bottom of the filtering frame 3 to perform filtering, allowing liquid in the slurry to be expelled as a filtrate and solid in the slurry to accumulate in the filtering frame as a filter cake; measuring filtering time t, measuring a mass m of expelled filtrate at the same time, closing the valve at the bottom of the filtering frame 3 and the gas valve upon the liquid in the filtering frame 3 is expelled to an extent that the level of the liquid is flush with an upper surface of the filter cake, draining the gas out of the filtering frame 3, and then sampling the expelled filtrate to analyze content of components and impurities contained in the expelled filtrate;

Step 3: inputting washing liquor into the filtering frame 3 through the buffer tank 2 to wash a filter case, introducing a gas at a pressure of 0.01-2.0 Mpa into the buffer tank 2 through the pressure stabilizing tank 1 and then into the filtering frame 3 during the washing process, opening the valve at the bottom of the filtering frame 3, measuring a mass of expelled washing filtrate via the electronic scale 5 until the mass of the expelled washing filtrate is equal to the mass of the input washing liquor, measuring the washing time, and then sampling the expelled washing filtrate to analyze content of components and impurities contained in the expelled washing filtrate;

Step 4: introducing a dry gas at a pressure of 0.01-2.0 Mpa into the buffer tank 2 through the pressure stabilizing tank 1 and then into the filtering frame 3, opening the valve at the bottom of the filtering frame 3, measuring a mass of expelled dried filtrate via the electronic scale 5, measuring the drying time, and then sampling the expelled dried filtrate to analyze content of components and impurities contained in the expelled dried filtrate; and Step 5: opening the filtering frame 3, measuring the thickness of the filter cake, and then sampling the filter cake to analyze moisture content of the filter cake as well as content of components and impurities contained in the filter cake.

EXAMPLES

1) A feeding inlet of the buffer tank 2 was opened while other valves were closed. Then, CTA slurry of 11.26 kg was fed into the buffer tank 2 and then conveyed to the filtering frame 3.

2) A gas valve at a gas inlet of the buffer tank 2 was open so that nitrogen gas at a preset pressure of 0.5 Mpa may be introduced into the buffer tank 2 through the pressure stabilizing tank 1 and then into the filtering frame 3. A valve at the bottom of the filtering frame 3 was opened for performing filtering, allowing liquid in the slurry to be expelled as a filtrate and solid in the slurry to accumulate in the filtering frame as a filter cake. The time t of the filtering process was measured as 33.6 s. The mass m of the expelled filtrate was measured as 4.63 kg. Upon the liquid in the filtering frame 3 was expelled to an extent that the level of the liquid was flush with an upper surface of a filter cake, the valve at the bottom of the filtering frame 3 and the gas valve for nitrogen gas were closed. Then, the nitrogen gas was drained out of the filtering frame 3. Then, the expelled filtrate was sampled to analyze content of acetic acid as well as content of the impurities such as cobalt and manganese contained in the expelled filtrate.

3) A washing liquor of 1.87 kg which was previously prepared by mixing acetic acid with water at acetic acid concentrations of 45%, 23%, 11% and 0%, respectively, was inputted into the filtering frame 3 through the buffer tank 2, to wash the filter cake. During the washing process, nitrogen gas at a preset pressure of 0.5 Mpa may be introduced into the buffer tank 2 through the pressure stabilizing tank 1 and then into the filtering frame 3. A valve at the bottom of the filtering frame 3 was opened. During the washing process, the mass of the expelled washing filtrate was measured via the electronic scale 5 until the mass of the expelled washing filtrate is equal to the mass of the input washing liquor. The time of the washing process was measured. The washing process was performed for 4 times in total. The mass of the expelled washing filtrate was identical in each of the four washing processes, i.e., 1.87 kg. The washing time was 7.5 s, 6.3 s, 5.4 s and 4.8 s, respectively. The expelled washing filtrate in each of the four washing processes was sampled to analyze content of acetic acid as well as content of the impurities such as cobalt and manganese contained in the expelled washing filtrate.

4) A dry gas at a preset pressure of 0.5 Mpa was introduced into the buffer tank 2 through the pressure stabilizing tank 1 and then into the filtering frame 3. Then, the valve at the bottom of the filtering frame 3 was opened. The mass of the expelled dried filtrate was measured as 2.1 kg via the electronic scale 5. The time of the drying process was measured as 11s. The expelled dried filtrate was sampled to analyze content of acetic acid as well as content of the impurities such as cobalt and manganese contained in the expelled dried filtrate.

5) The filtering frame 3 was opened. The thickness of the filter cake was measured as 150 mm. Further, the filter cake was sampled to analyze the moisture content of the filter cake as 15%, and also to analyze content of acetic acid as well as content of the impurities such as cobalt and manganese contained in the filter cake.

As compared with the prior art, the present invention has the following advantages.

1) The present invention has a short testing process and a simple structure by employing a simple testing method. The core component in the testing device for the rotary pressure filter according to the present invention is the filtering frame which may be a small part on a drum of the rotary pressure filter. Therefore, a simple structure and low manufacturing cost may be obtained. On the other hand, the core component in a conventional testing device is the testing device for the rotary pressure filter which is designed and manufactured according to a large-sized industrial rotary pressure filter exactly, is merely scaled down in volume and includes all of the components of the large-sized industrial rotary pressure filter, such as a driving system, resulting in a complex structure and high manufacturing cost.

2) The present invention is capable of completely simulating all the processes actually performed by the equipments according to the material characteristics, such as a filtering process, different times of washing processes, and different times of drying processes, and enabling to obtain reliable design parameters such as filtering capability, washing effects, and drying effects. When the testing device for the rotary pressure filter according to the present invention is used for performing a test, all the processes are independent and intermittent, and do not influence each other. Further, the testing results from all the processes may be analyzed and evaluated independently. Therefore, the obtained results may be accurate and reliable. On the other hand, a conventional testing device for the rotary pressure filter has certain limitations during testing. That is, the conventional testing device runs continuously like an industrial machine such that the testing effects of each process could not be obtained directly. Further, all the processes are performed sequentially and associated with each other. Therefore, the processes may influence each other, making it impossible to obtain accurate and reliable results.

3) The present invention may simplify a complex testing process. That is, testing device for the rotary pressure filter according to the present invention may connect a series of simple units sequentially so as to simulate one or several working processes performed in a complex device completely and really, and may obtain accurate and reliable results.

4) The present invention may well meet the requirements in the industrial design, and may be applied to test the rotary pressure filters for PTA, CTA or other materials.

5) The present invention is capable of testing the parameters of materials, i.e., measuring the analysis parameters of the filtrate and the filter cake by the steps of filtering, washing and drying, such as content of acetic acid and content of the impurities such as cobalt and manganese contained in CTA materials. Moreover, the testing of the material parameters according to the present invention may be used for the module selection and design in the manufacturing process of rotary pressure filters.

Of course, the invention may have other embodiments. Those skilled in the art can make various corresponding changes and modifications according to the invention without departing from the spirit and essence of the invention, but such changes and modifications shall be incorporated in the protection scope of the appended claims of the invention.

What is claimed is:

1. A testing device for a rotary pressure filter, comprising:
a pressure stabilizing tank;
a buffer tank connected to the pressure stabilizing tank through a first pipe;
a filtering frame designed to be a part of a drum of the rotary pressure filter, said filtering frame being disposed under the buffer tank and connected to the buffer tank through a second pipe;
a liquid receiving tank disposed under the filtering frame for receiving a filtrate expelled from the filtering frame;
a valve disposed under the filtering frame above the liquid receiving tank; and
an electronic scale disposed at a bottom of the liquid receiving tank for measuring filtrate expelled into the liquid receiving tank.

2. The testing device for the rotary pressure filter according to claim 1, further comprising a chronograph for time measurement.

3. The testing device for the rotary pressure filter according to claim 1, wherein the pressure stabilizing tank is connected to a gas storage tank.

4. A testing method for a rotary pressure filter, said method comprising:
a first step of opening a feeding inlet of a buffer tank, feeding slurry into the buffer tank, and conveying the slurry to a filtering frame;

a second step of opening a gas valve at a gas inlet of the buffer tank, introducing a gas at a pressure of 0.01-2.0 Mpa into the buffer tank through a pressure stabilizing tank, opening a valve at a bottom of the filtering frame to perform filtering, allowing liquid in the slurry to be expelled as a filtrate and solid in the slurry to accumulate in the filtering frame as a filter cake, measuring filtering time, and measuring a mass of expelled filtrate at the same time by an electronic scale and recording the measured mass, closing the valve at the bottom of the filtering frame and the gas valve upon the liquid in the filtering frame is expelled to an extent that the level of the liquid in the filtering frame is flush with an upper surface of the filter cake, draining the gas out of the filtering frame, and then sampling the expelled filtrate to analyze content of components and impurities contained in the expelled filtrate;

a third step of inputting washing liquor into the filtering frame through the buffer tank to wash the slurry, introducing a gas at a pressure of 0.01-2.0 Mpa into the buffer tank through the pressure stabilizing tank and then into the filtering frame through the buffer tank during the washing process, opening the valve at the bottom of the filtering frame, measuring a mass of expelled washing filtrate via the electronic scale until the mass of the expelled washing filtrate is equal to a mass of the input washing liquor, measuring the washing time, and sampling the expelled washing filtrate to analyze content of components and impurities contained in the expelled washing filtrate;

a fourth step of introducing a dry gas at a pressure of 0.01-2.0 Mpa into the pressure stabilizing tank and then into the filtering frame through the buffer tank, then opening the valve at the bottom of the filtering frame, measuring a mass of expelled dried filtrate via the electronic scale, measuring the drying time, and then sampling the expelled dried filtrate to analyze content of components and impurities contained in the expelled dried filtrate; and a fifth step of opening the filtering frame, measuring a thickness of the filter cake in the filtering frame, and then sampling the filter cake to analyze moisture content of the filter cake as well as content of components and impurities contained in the filter cake.

5. The testing method according to claim 4, wherein the slurry is a suspension in which solid and liquid may be freely separated by sediment.

6. The testing method according to claim 4, wherein the slurry is CTA slurry, PTA slurry, catalyst slurry or pulverized coal slurry.

7. The testing method according to claim 4, wherein the gas is nitrogen gas, compressed air or an inert gas.

8. The testing method according to claim 4, wherein the filtering process in the second step is performed once or many times;
the washing process in the third step is performed once or many times;
the drying process in the fourth step is performed once or many times, and
wherein, the order of the filtering process in the second step, the washing process in the third step, and the drying process in the fourth step can be exchanged.

9. The testing method according to claim 4, wherein the pressure stabilizing tank is a pressure reducing valve.

10. A designing method for a rotary pressure filter, comprising:

a first step of opening a feeding inlet of a buffer tank, feeding slurry into the buffer tank, and conveying the slurry to a filtering frame;

a second step of opening a gas valve at a gas inlet of the buffer tank, introducing a gas at a pressure of 0.01-2.0 Mpa into the buffer tank through a pressure stabilizing tank, opening a valve at a bottom of the filtering frame to perform filtering, allowing liquid in the slurry to be expelled as a filtrate and solid in the slurry to accumulate in the filtering frame as a filter cake; measuring filtering time, and measuring a mass of expelled filtrate at the same time by an electronic scale and recording the measured mass, closing the valve at the bottom of the filtering frame and the gas valve upon the liquid in the filtering frame is expelled to an extent that the level of the liquid in the filtering frame is flush with an upper surface of the filter cake, draining the gas out of the filtering frame, and then sampling the expelled filtrate to analyze content of components and impurities contained in the expelled filtrate;

a third step of inputting washing liquor into the filtering frame through the buffer tank to wash the slurry, introducing a gas at a pressure of 0.01-2.0 Mpa into the buffer tank through the pressure stabilizing tank and then into the filtering frame through the buffer tank during the washing process, opening the valve at the bottom of the filtering frame, measuring a mass of expelled washing filtrate via the electronic scale until the mass of the expelled washing filtrate is equal to the mass of the input washing liquor, measuring the washing time, and sampling the expelled washing filtrate to analyze content of components and impurities contained in the expelled washing filtrate;

a fourth step of introducing a dry gas at a pressure of 0.01-2.0 Mpa into the pressure stabilizing tank and then into the filtering frame through the buffer tank, then opening the valve at the bottom of the filtering frame, measuring a mass of expelled dried filtrate via the electronic scale, measuring the drying time, and then sampling the expelled dried filtrate to analyze content of components and impurities contained in the expelled dried filtrate; and a fifth step of opening the filtering frame, measuring a thickness of the filter cake in the filtering frame, and then sampling the filter cake to analyze moisture content of the filter cake as well as content of components and impurities contained in the filter cake.

\* \* \* \* \*